Oct. 6, 1970         A. C. AVRIL            3,532,328
SEALING ASSEMBLY FOR DRY BLENDING EQUIPMENT
Filed Jan. 16, 1969                    5 Sheets-Sheet 1

INVENTOR.
Arthur C. Avril
BY Wood, Herron & Evans
ATTORNEYS

INVENTOR.
Arthur C. Avril
BY Wood, Herron & Evans
ATTORNEYS

Oct. 6, 1970           A. C. AVRIL           3,532,328
SEALING ASSEMBLY FOR DRY BLENDING EQUIPMENT
Filed Jan. 16, 1969           5 Sheets-Sheet 5
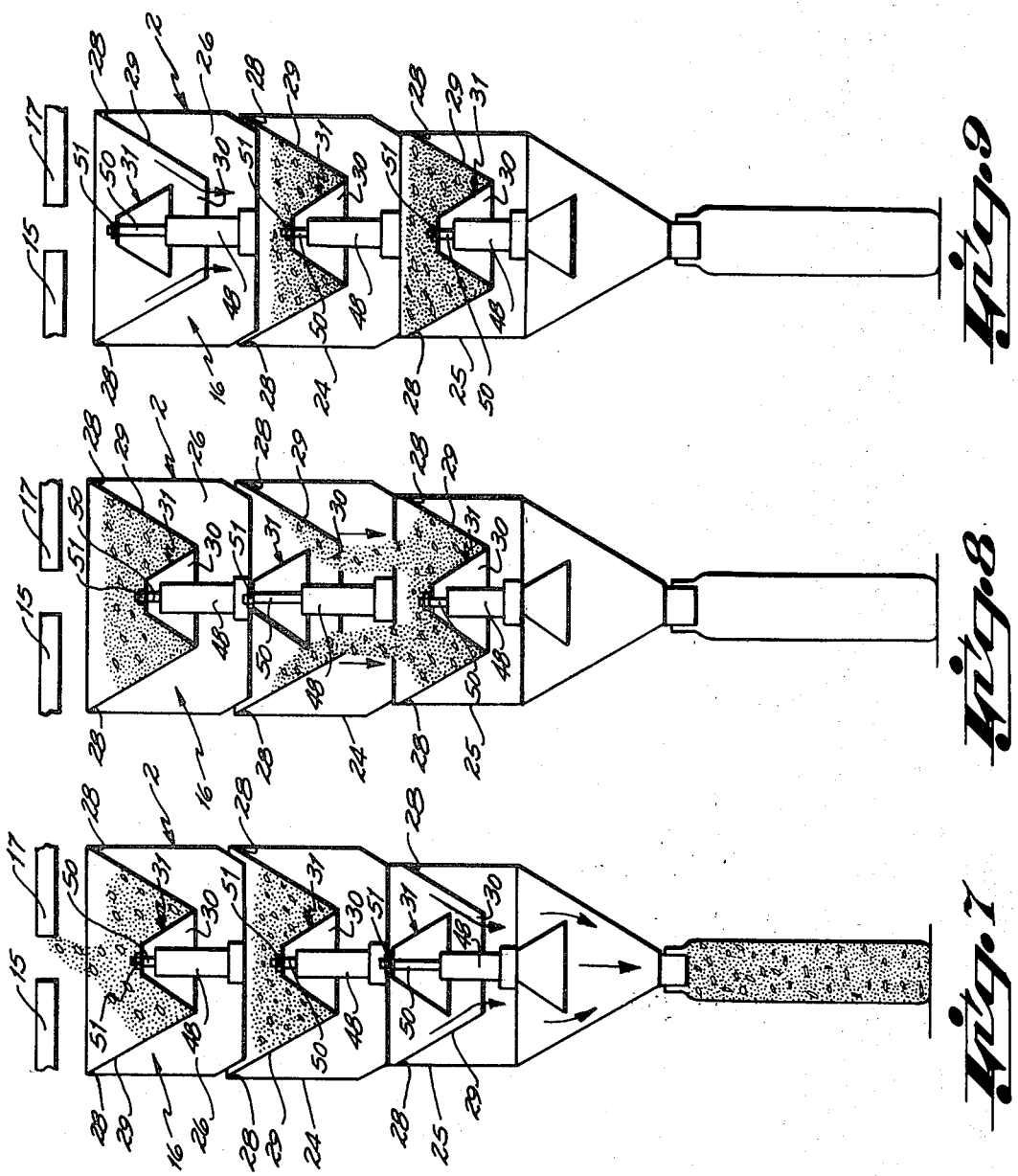
INVENTOR.
BY *Arthur C. Avril*
*Hood, Horron & Evans*
ATTORNEYS 've been patented

United States Patent Office 3,532,328
Patented Oct. 6, 1970

3,532,328
SEALING ASSEMBLY FOR DRY BLENDING EQUIPMENT
Arthur C. Avril, Cincinnati, Ohio, assignor to A & T Development Corp., Cincinnati, Ohio, a corporation of Ohio
Filed Jan. 16, 1969, Ser. No. 791,629
Int. Cl. B28c 5/04
U.S. Cl. 259—150                                6 Claims

ABSTRACT OF THE DISCLOSURE

A sealing ring assembly for an apparatus utilized in blending dry materials, the apparatus having an inverted receiving cone including a discharge opening at its lower end and an upright shiftable discharge cone controlling the flow of dry material from the discharge opening of the receiving cone. The sealing ring assembly comprises a gasket-retaining ring having an outwardly-facing groove, with a resilient gasket or sealing ring, which is circular in cross section, seated within the outwardly facing groove and clamped in place. A chordal portion of the resilient gasket projects outwardly beyond the outer periphery of the gasket-retaining ring for engagement with the inner surface of the receiving cone adjacent its discharge opening and provides a wiping engagement with the internal surface of the receiving cone to control the flow of material through the discharge opening.

BACKGROUND OF THE INVENTION

The invention relates to a blending apparatus for mixing a combination of dry materials, for example, quantities of dry sand, aggregates and dry portland cement in the production of a packaged dry concrete mixture. The blending apparatus is also intended to be utilized in the blending of various other dry granulated or pulverized materials which, after having been blended in metered quantities, are discharged into a container, such as a paper bag.

Generally speaking, the blending apparatus for which the sealing ring assembly is particularly intended, is of a multistage type, having inverted receiving cones and upright discharge control cones, operating along principles disclosed in the prior Avril Pat. No. 3,369,798. The improved blending apparatus of this invention operates in conjunction with the heat exchange apparatus disclosed in the prior Avril Pat. No. 2,904,942.

A primary objective of the present invention has been to provide a sealing ring assembly which is mounted upon the base or lower edge portion of the discharge control cone, in which the seal is resistant to wear under long periods of service, thereby increasing the useful life of the blending apparatus.

According to this aspect of the invention, the lower edge or base of the upright discharge control cone includes a gasket-retaining ring assembly having clamped therein a resilient gasket which is circular in cross section. The outside diameter of the retaining ring is smaller in diameter than the resilient gasket, such that a choral portion of the gasket projects outwardly to be presented to the internal periphery of the receiving cone above its discharge opening to provide a seal. Since the resilient gasket is circular in cross section and firmly clamped, there is no bending of the gasket with consequent wear and failure which is ordinarily associated with a flat sealing ring which engages the interior surface of the receiving cone.

Another objective has been to provide a gasket mounting ring assembly permitting replacement of the gasket ring in a simple convenient manner if the gasket ring exhibits wear because of the abrasive action of the dry mixture after prolonged service.

According to this aspect of this invention, the worn resilient gasket may be rotated about the axis of its circular cross section, so as to present the surface previously seated within the annular groove of the retaining ring, with its worn surface disposed within the ring. This operation may be carried out in a convenient manner by loosening the several screws which clamp the retaining ring and gasket in pressure engagement with respect to an internal flange which is secured to the base of the discharge control cone. Alternatively, the worn ring may be removed in the same manner and replaced with a new ring to be clamped in place as described above.

A further objective of the invention has been to provide a clamping ring assembly which clamps the resilient gasket under pressure, thereby to squeeze the chordal portion of the resilient gasket outwardly beyond the periphery of the retaining ring to present the chordal portion to the internal periphery of the receiving cone under stress to improve the sealing action.

DESCRIPTION OF THE DRAWINGS

FIGS. 7, 8 and 9 are diagrammatic views illustrating the sequential action of the blending units of the invention during the steps of blending and bagging the dry concrete material.

BLENDING APPARATUS GENERALLY

Figure 1:
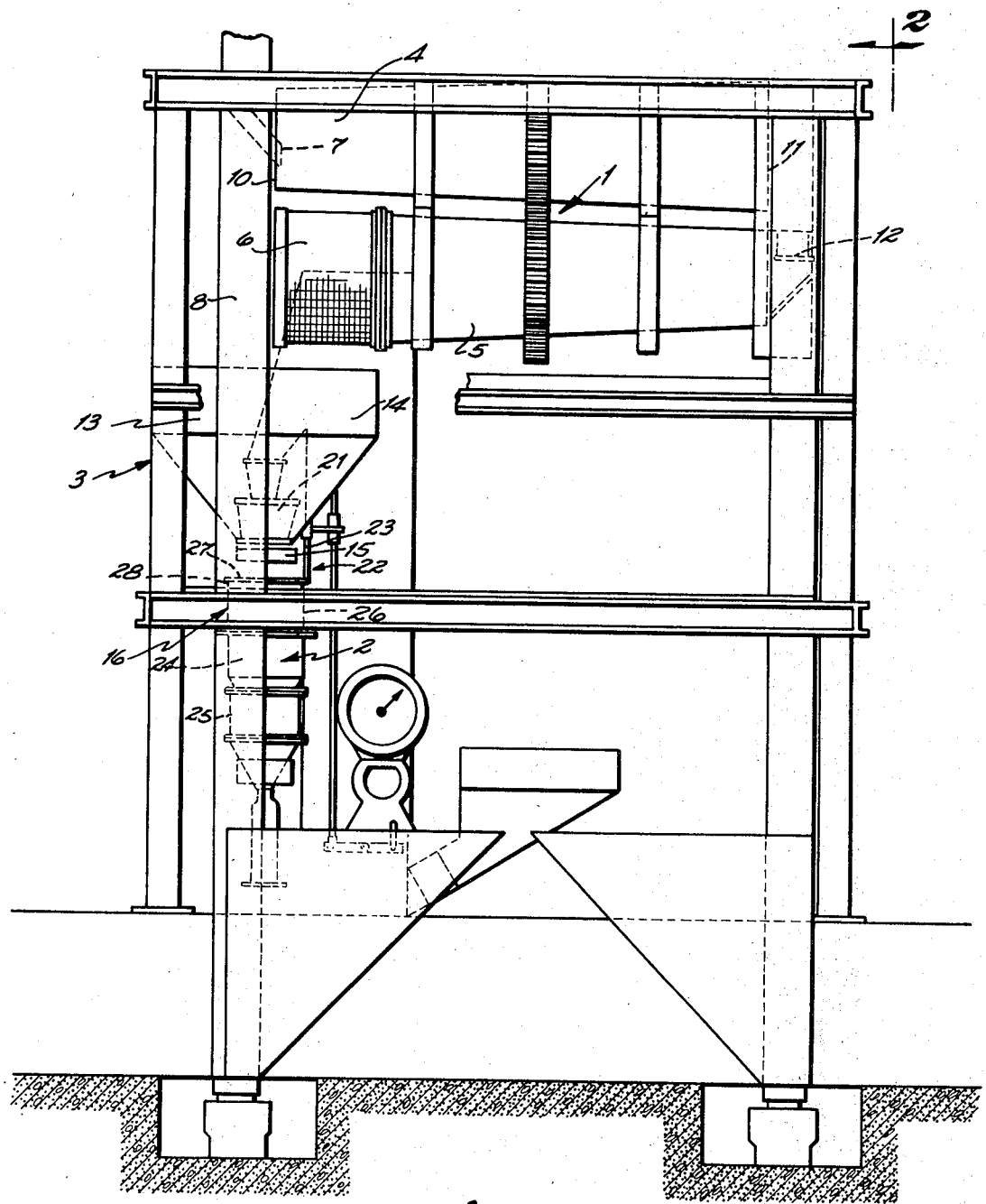
FIG. 1 is a side elevation of the packaging plant, showing in a general way the heat exchange apparatus combined with the improved blender of this invention.
Figure 2:
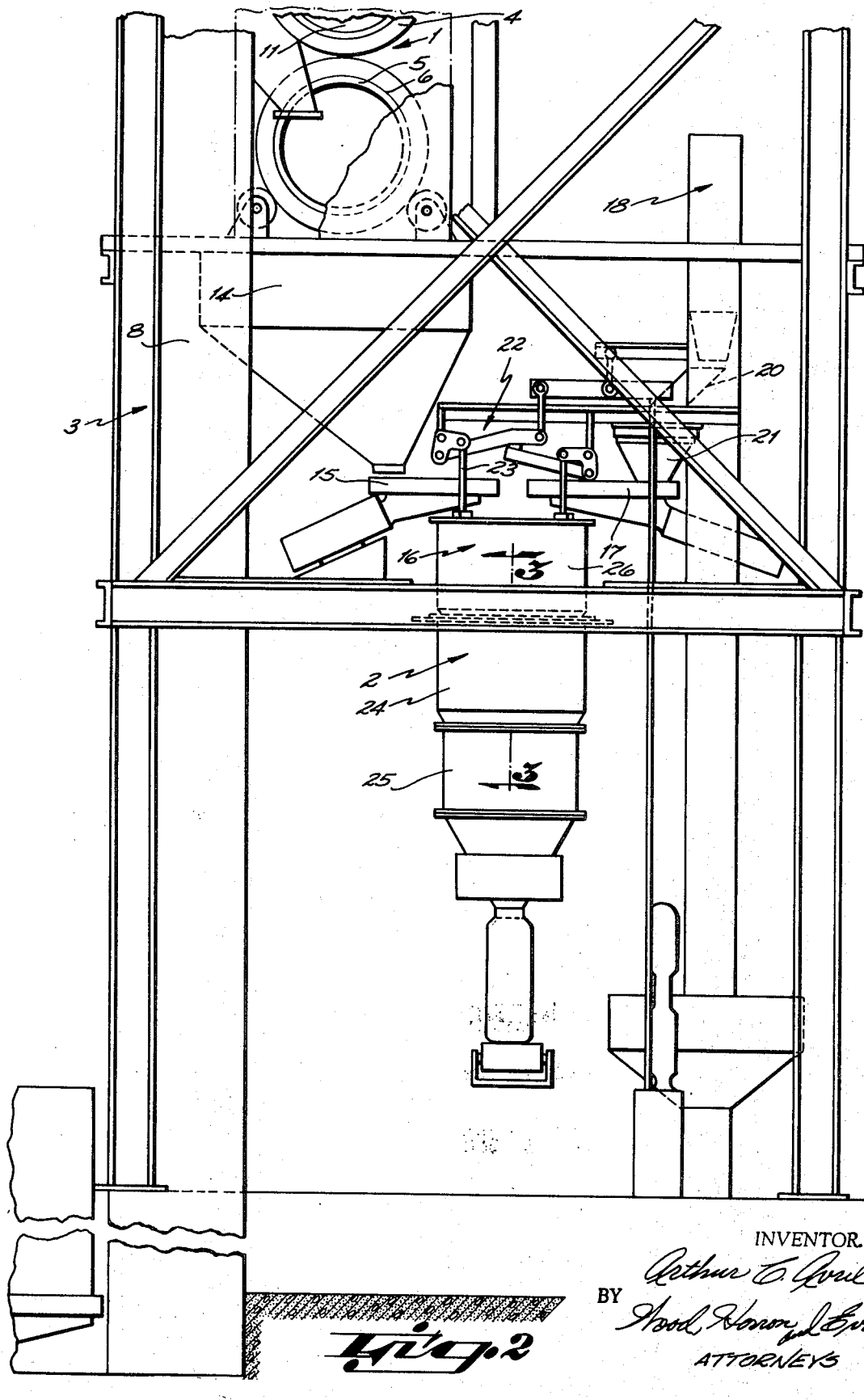
FIG. 2 is an enlarged fragmentary end elevation of the packaging plant as projected along the line 2—2 of FIG. 1, further illustrating the general arrangement of the improved blending apparatus in relation to the weighing apparatus which coacts with the blender.

Referring to FIGS. 1 and 2, the heat exchange apparatus, indicated generally at 1, has been selected to illustrate the improved blender of the present invention, which is indicated generally at 2. As noted earlier, the blender is disclosed in the Avril Pat. No. 3,369,798 which was issued on Feb. 20, 1968. The blending apparatus disclosed in the present application is identical to the structure disclosed in the prior Avril patent except that the improved structure includes the ring-type seal as distinguished from the sealing strip disclosed in the prior patent.

It will be understood that the heat exchange packaging plant (FIGS. 1 and 2) is of the type which is utilized in conjunction with the improved blending apparatus of the present invention. A generalized description of the plant and weighing apparatus is included in this specification in order to clarify the operation of the improved blending apparatus.

Described generally (FIGS. 1 and 2), the packaging plant, including the present blending apparatus, comprises a framework formed of structural steel members indicated generally at 3. The heat exchange apparatus 1 in the present disclosure comprises a pair of parallel drums 4 and 5, arranged one above the other as disclosed in the prior patent (No. 3,369,798). The upper drum 4 constitutes a sand heating drum and the lower drum 5 comprises a heat exchange drum. In general the raw sand is dehydrated during passage through the sand heating drum 4 and is fed into the lower heat exchange drum 5 and mixed with the raw gravel. After passage through the heat exchange drum 5, the dehydrated sand and aggregates (gravel) pass through a cylindrical separator screen 6 projecting from the end portion of the heat exchange drum 5 (FIG. 1).

According to this structure, the raw sand is fed into the charging end of the drum 4 by way of the sand feeding spout 7, which forms a part of the sand elevator 8. The raw sand is fed into the charging end 10 of the sand heating drum 4 which is tapered longitudinally from its charging end 10 to its discharge end 11. During passage through the sand heating drum, the raw sand is agitated and is heated by a blast flame to a temperature in the neighborhood of 175° F. to 375°. Upon reaching the discharge end 11 of the sand heating drum, the hot dehydrated sand and a flow stream of raw moist gravel is passed by way of the spout 12 into the heat exchange drum 5, whereby the two ingredients are commingled. Upon reaching the end of the heat exchange drum, the sand is separated from the gravel by being passed through the rotating cylindrical screen 6. At this point, the dehydrated gravel passes from the end of the cylindrical screen 6 into a surge hopper 13, while the dehydrated sand passes through the screen 6 and drops by gravity in the sand surge hopper 14.

From the surge hoppers 13 and 14, the sand and gravel are fed by way of a vibratory feeder 15, in measured amounts, to the upper section generally indicated at 16 of the blending apparatus, previously indicated at 2. As the hydrated sand and gravel are fed into the upper section 16 of the blending apparatus 2 by the vibrating feeder 15, a quantity of dry portland cement is also fed into the upper section 16 by way of the cement feeder 17, which is also of the vibratory type. The cement is fed to the cement feeder 17 by way of a cement elevator indicated generally at 18, which includes a spout 20 leading to the surge hopper 21. The quantities of dehydrated sand, gravel, and portland cement are fed into the blending apparatus 2 in predetermined quantities under the control of a weighing apparatus which is indicated generally at 22 (FIGS. 1 and 2).

During the weighing cycle, the portland cement is first fed into the upper section or weighing hopper 16 of the blending apparatus 2 by cement feeder 17. Since the weighing apparatus does not form any part of the present invention, a detailed description of this mechanism is omitted.

After the cement feeder 17 is decommissioned by the weighing mechanism, the vibratory sand and gravel feeder 15 is energized to feed the mixture of sand and gravel into the upper weighing section 16 of the blending apparatus. The sand and gravel feeder 15 continues vibrating until the predetermined weight load of sand and gravel has been advanced into the upper section 16, as predetermined in quantity by weight. When this amount of sand and gravel feeder has been advanced, the sand and gravel feeder is decommissioned by operation of the weighing mechanism 22 and the blending apparatus is then ready for the bagging operation.

BLENDING APPARATUS

Figure 3:
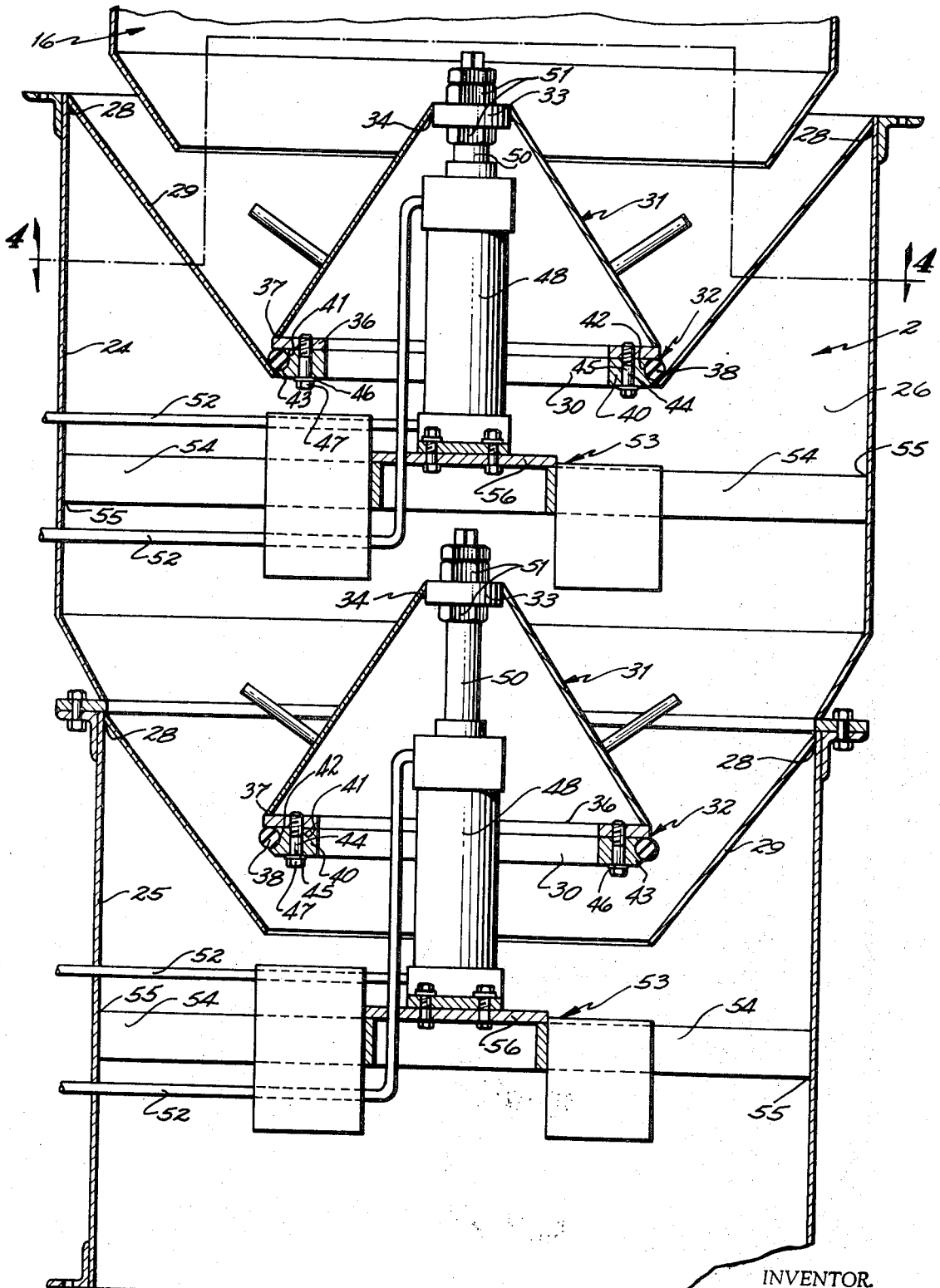
FIG. 3 is an enlarged fragmentary sectional view taken from FIG. 2, along the line 3—3, detailing the upper portion of the blending apparatus.

The blending apparatus, previously indicated at 2, in the present example, comprises three blending sections comprising the upper weighing section previously indicated at 16, together with the lower blending sections 24 and 25 (FIGS. 1–3). The structure disclosed herein provides a three-stage blending operation, that is, the successive batches pass through the three blending sections during each cycle as disclosed in the aforesaid Avril Pat. 3,369,789, before reaching the bag in which the material is packaged. The three-stage blending apparatus provides more rapid packaging and more thorough blending because, during each packaging cycle, two batches of ingredients are progressing through the blender while a third batch is being fed into the weighing section 16 by the feeders 15 and 17. The sequential operations are carried out automatically each time the weighing and bagging cycles are initiated by the operator.

Described in detail (FIGS. 2–4) the upper section 16, which is suspended from the weighing apparatus 22 by the links 23, comprises a cylindrical chamber 26 having a top flange 27 to which the links 23 are attached for suspending the upper section 16. The upper section 16 includes a receiving cone 29 (FIGS. 7–9) in the form of an inverted frustum formed of sheet metal with its upper edge secured to the upper edge of the chamber 26.

The upper edge of the receiving cone 29 is secured to the upper edge of the cylindrical chamber 26 preferably by welding, as indicated at 28. The lower end portion of the receiving cone 29 forms a discharge opening 30 (FIGS. 3 and 7–9) which is sealed by the lower edge of a discharge control cone indicated generally at 31 (FIGS. 7–9). The improved sealing ring structure, indicated generally at 32 (FIGS. 3, 4 and 6), is described in greater detail later.

The discharge cone 31 is in duplicate for the three sections of the blending apparatus, consisting of the upper weighing section 16, which, as noted earlier, is suspended from the weighing apparatus and also including the lower blending sections 24 and 25. For this reason, the several discharge control cones 31 of the three sections are all identified by the numeral 31 in order to simplify the disclosure.

Each discharge cone 31 is in the form of an upright frustum, the upper end portion of each cone being removed as distinguished from running to a point, to receive a top wall 33 (FIG. 3) in the form of a circular washer which interfits the opening of the control cone 31, being welded thereto as indicated at 34. The discharge control cone 31, in each instance, is provided with a series of outwardly projecting rods 35 spaced about the periphery of the cone, the rods having ends preferably welded to the surface of the control cone 31.

Each discharge control cone 31, at its base or lower end, is provided with the seal ring assembly 32 of this invention. The purpose of the ring assembly is to provide a seal which prevents the sifting of fine particles, such as cement, through the open end of the receiver cone 29 as the dry ingredients are charged into the receiving cone 29 (FIG. 3).

SEALING RING ASSEMBLY

The sealing ring assembly 32 of the present invention is substituted for the flat gasket structure which is utilized in the prior Avril Pat. 3,369,798. The improved arrangement eliminates fatigue and wear which may be associated with a flat gasket or sealing strip since it is not capable of being bent during the reciprocating movement of the discharge control cones 31. Moreover, the ring arrangement provides an improved seal and also presents a simplified structure. A further advantage of the present structure 32 arises from the fact that the sealing ring, while providing improved wearability, also is more readily replaced in the event of wear after prolonged service.

In order to mount the ring seal 32, the lower edge portion of each discharge control cone 31 is provided with an internal flange 36 (FIGS. 3 and 6) in the form of a ring which is preferably welded as at 37 to the lower edge of each discharge control cone 31. The internal flange 36 forms, at least partially, a seat for the ring 38 which forms the seal, as described below.

Described in detail (FIGS. 3, 4 and 6) the resilient sealing ring 38 preferably is a commercially available product, known as an O-ring, which is cylindrical in cross section formed of rubber, synthetic rubber or a similar resilient material. The O-ring 38 is secured in place beneath the internal flange 36 by a clamping or retaining ring 40, the outer periphery of which includes groove 42 which is semi-circular in cross section to receive the O-ring 38. The distance indicated at A (FIG. 6) from the lower surface of the groove 42 to the lower surface 41 of the internal flange 36 is slightly less than the diameter, in cross section, of the O-ring 38. As a consequence, the O-ring is clamped under a predetermined amount of compression between the lower surface 41 of the internal clamping flange 36 and the upwardly facing portion 43 of the annular groove 42.

The clamping or retaining ring 40 is provided with a series of screws 44 (FIG. 6), each screw having a shank portion 45 passing through the ring 40 and into threaded engagement with the internal flange 36. Since the annular groove 42 of the clamping ring 40 has a slightly smaller diameter than the ring 38, the screws 44, upon being tightened, cause the ring to be held under slight compression between the lower surface 41, flange 36 and the upwardly facing portion 43 of annular groove 42. The clamping screws 44 each include a lock washer 46 interposed between the lower surface of clamping ring 40 and the head 47 of the clamping screw.

Each discharge control cone 31 of the blending sections 16, 24 and 25 is shifted from its closed charging position to its open discharge position (FIGS. 3 and 7–9) by a respective air cylinder 48. Each air cylinder 48 includes a piston (not shown), with a piston rod 50 projecting from its upper end through the top wall 33 of the control cone 31 and secured by clamping nuts 51 threaded on the piston rod 50. Air pressure is supplied to the cylinders 48 by way of flexible conduits 52—52 communicating with the opposite ends of the cylinder.

In order to elevate the discharge control cones 31, air pressure is supplied to the lower end of the cylinder by way of the lower conduit 52 and is exhausted from the upper end of the cylinder by way of upper conduit 52, as shown with reference to the lower section 25 in FIG. 3 in which cone 31 is elevated. In order to lower the cone 31 as shown with respect to the immediate blending section 24 (FIG. 3), air pressure is supplied to the upper end of piston cylinder 48 and is exhausted by way of the lower end through the lower conduit 52. This operation is regulated by a control system (not shown).

It will be understood at this point, that the control cone 31, in each instance, is forced downwardly so as to seat the resilient ring 38 forcibly against the internal surface of the receiving cone 29 to provide a seal which is effective to prevent sifting of the fine particles, such as cement.

Figure 4:
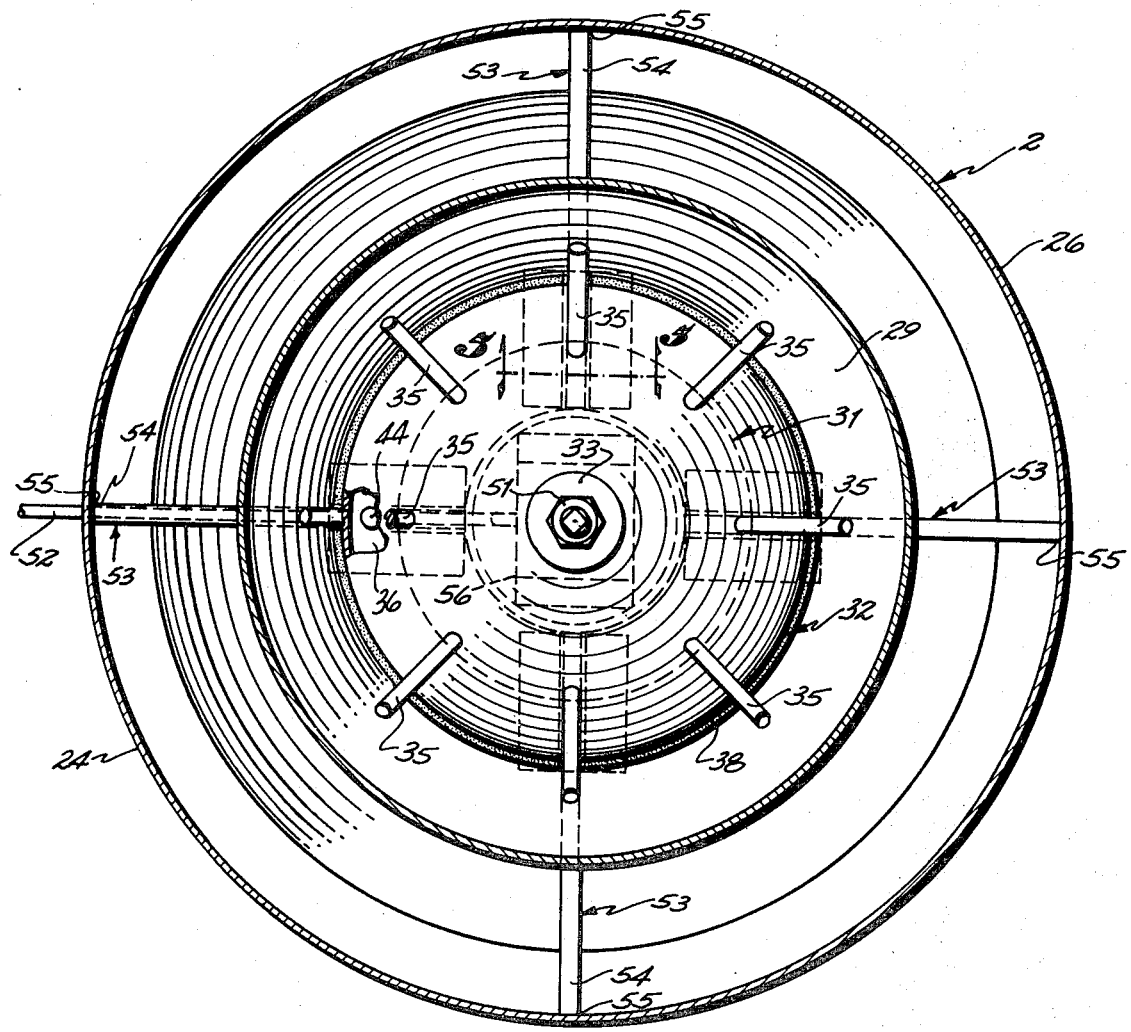
FIG. 4 is a sectional view taken along the line 4—4 of FIG. 3, further detailing the blending apparatus.

As best shown in FIGS. 3 and 4, each air cylinder 48 has its lower end supported upon a spider, indicated generally at 53, which is mounted in the cylindrical chamber 26 of the several blending sections 16, 24 and 25. Each spider, in the present example, comprises four radial bars 54 having their outer ends welded as at 55 to the cylindrical chamber 26, with a box-like framing member 56 at the center of the spider for seating the lower end of the respective cylinders 48. Each blending section 16, 24 and 25 thus constitutes a self-contained unit.

Figure 6:
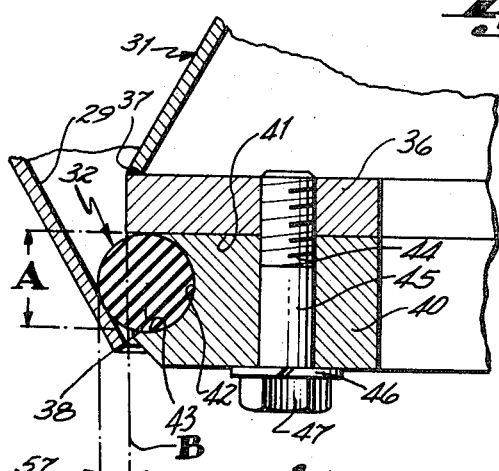
FIG. 6 is an enlarged fragmentary view taken from FIG. 3, detailing the sealing ring or gasket assembly of this invention.
Figure 5:
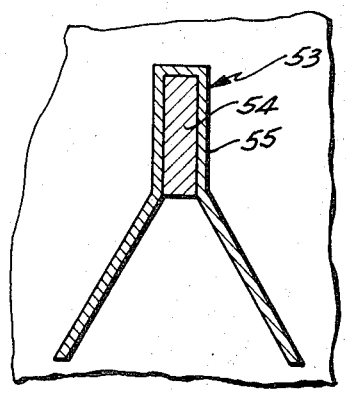
FIG. 5 is a sectional view taken along the line 5—5 of FIG. 4, further detailing one of the blending units.

Since the resilient seal ring 38 is confined within the annular groove 42 which is partially semi-circular in cross section, with only the chordal portion 57 (FIG. 6) of the ring exposed. The ring 38 is firmly gripped within its recess and clamped between the downwardly facing surface 41 and upwardly facing portion 43 of recess 42. It will be seen therefore, that the outwardly projecting chordal portion 57 of the O-ring presents a stressed sealing area with reference to the internal surface of the receiving cone as it is forced downwardly to its closed position by the air cylinder 48. It will be understood, at this point, that the chordal portion 57 of the seal ring 38 provides a wiping engagement with the internal periphery of the receiving cone adjacent the discharge opening 30. As shown in FIG. 6, the chordal portion 57 of the sealing ring or O-ring is delineated by the line B, which is projected downwardly from the external periphery of the internal flange 36, and which passes the outer periphery of the clamping ring 40.

The compressive action of each clamping ring 40 presents the chordal portion 57 of the sealing gasket under compression with reference to the internal surface of the receiving cone 29 adjacent its discharge opening 30. By virtue of the fact that the sealing gasket is circular in cross section and is clamped in position, the chordal portion 57 of the ring is not capable of flexing to any substantial extent with respect to the internal periphery of the receiving cone 27 immediately above the discharge opening 30, thereby to provide a long-lived sealing assembly.

Having described my invention, I claim:

1. In an apparatus for blending granulated materials which includes an inverted receiver cone having a discharge opening at its lower end and an upright discharge control cone disposed within the lower portion of the receiver cone, the discharge control cone being shiftable from a lowered charging position to an elevated discharge position with reference to the discharge opening, a sealing ring assembly for the base of the discharge control cone comprising:

a gasket-retaining ring secured to the base of the discharge control cone and having an outwardly facing annular groove formed in the periphery thereof;

a gasket formed of resilient material seated within the outwardly facing annular groove of the retainer ring, said gasket being generally circular in cross section;

said gasket having a chordal portion projecting outwardly beyond the outer periphery of the gasket-retaining ring, said chordal portion engageable with the internal surface of the receiving cone adjacent the discharge opening thereof;

clamping means engaging the said gasket and clamping the gasket within the annular groove of the gasket retaining ring;

and a reversible power device connected to the discharge control cone for shifting the discharge control cone from the lowered charging position in which the chordal portion of the gasket engages the periphery of the receiver cone above the discharge opening to an elevated discharge position with the chordal position of the gasket spaced above the peripheral surface of the inverted receiver cone above the discharge opening and thereby providing an annular discharge passageway delineated by the gasket at the base of the discharge control cone and the periphery of the discharge opening of the receiver cone.

2. In an apparatus for blending dry granulated materials which includes an inverted receiver cone having a discharge opening at its lower end having an upright discharge control cone disposed within the lower portion of the receiver cone and adapted to be shifted, from a lowered charging position to an elevated discharge position, a sealing ring assembly for the base of the discharge control cone comprising:

an annular flange extending about the base of the discharge control cone and having a downwardly facing surface;

a gasket-retaining ring disposed beneath the said annular flange of the discharge control cone:

said gasket-retaining ring having an outwardly facing annular groove formed in the outer periphery thereof, said groove being partially circular in cross section and having an upwardly facing surface;

a gasket formed of resilient material seated within the outwardly facing annular groove of the gasket-retaining ring, said gasket being generally circular in cross section and having a chordal portion projecting outwardly beyond the periphery of the gasket-retaining ring;

clamping means engaging and compressing the resilient gasket between the upward facing portion of the annular groove of the gasket-retaining ring and the downwardly facing surface of the annular flange of the discharge control cone;

said clamping means compressing the resilient gasket under pressure within the annular recess of the retaining ring and thereby stressing said chordal portion which projects outwardly beyond the periphery of the gasket-retaining ring;

and a reversible power device connected to the discharge control cone for shifting the control cone and the said resilient gasket from said lowered changing position to said elevated discharge position, with the chordal portion of the said gasket spaced above the internal peripheral surface of the inverted receiver cone and thereby providing an annular discharge passageway about the base of the discharge control cone and the discharge opening of the receiver cone;

said annular passageway adapting the moves of dry granulated materials to cascade through said annular passageway in the form of circular flow stream.

3. A sealing structure for a blending apparatus as set forth in claim 2, in which the annular groove of the gasket-retaining ring has a partially circular cross-sectional diameter, the annular groove having a lower, upwardly facing portion which projects outwardly beyond the downwardly facing portion of the annular groove for forcing the gasket against the downwardly facing surface of the annular flange.

4. A sealing structure for a blending apparatus as set forth in claim 2 in which the clamping means comprises a plurality of screws passing upwardly through the gasket-retaining ring, said screws having shank portions in threaded engagement with the annular flange of the charging cone and having heads engaged against the lower surface of the gasket-retaining ring, thereby compressing the resilient gasket under pressure and squeezing outwardly the chordal portion thereof which engages the periphery of the receiving cone above the periphery of the discharge opening.

5. A sealing structure for a blending apparatus as set forth in claim 2 in which the annular groove of the gasket-retaining ring engages the lower portion of the resilient gasket under pressure, thereby squeezing outwardly the chordal portion of the gasket which engages the periphery of the receiving cone above the periphery of the discharge opening and in which the lower portion of the gasket-retaining ring is tapered downwardly and inwardly from the lower edge of the said annular groove, the taper of the retaining-ring corresponding generally to the taper of the receiving cone, thereby providing clearance between the retainer-ring and internal periphery of the receiving cone above the discharge opening and presenting the chordal portion of the gasket to the periphery of the receiving cone above the discharge opening.

6. A sealing structure for a blending apparatus as set forth in claim 2 in which the clamping means which engages the lower portion of the retaining ring, clamps the gasket under pressure, thereby stressing the chordal portion of the gasket which engages the periphery of the receiving cone above the periphery of the discharge opening, said reversible power means of the discharge control cone shifting the control cone downwardly under pressure and bringing the said stressed chordal portion of the gasket into pressure engagement with the internal periphery of the receiving cone above the discharge opening.

References Cited

UNITED STATES PATENTS

| | | | |
|---|---|---|---|
| 1,072,143 | 9/1913 | Simpson | 259—150 |
| 1,224,656 | 5/1917 | Candliss | 259—150 |
| 1,405,707 | 2/1922 | Beers | 259—150 |
| 3,369,798 | 2/1968 | Avril | 259—148 |

ROBERT W. JENKINS, Primary Examiner

U.S. Cl. X.R.

259—154